July 9, 1940.   D. SILVERMAN   2,206,894
METHOD AND APPARATUS FOR ELECTRICAL LOGGING
Filed Oct. 31, 1939

INVENTOR
Daniel Silverman
BY Clarence H. Seeley
ATTORNEY

Patented July 9, 1940

2,206,894

UNITED STATES PATENT OFFICE 2,206,894

METHOD AND APPARATUS FOR ELECTRICAL LOGGING

Daniel Silverman, Tulsa, Okla., assignor to Stanolind Oil and Gas Company, Tulsa, Okla., a corporation of Delaware Application October 31, 1939, Serial No. 302,235

14 Claims. (Cl. 175—182)

This invention relates to the electrical logging of earth formations and more particularly to a method and apparatus for determining the location of the discontinuities in the walls of a well due to the various earth strata traversed thereby.

A number of methods of making a log of the strata penetrated by a well are known in the art and among them are those involving the measurement of the specific resistivities of the strata at various levels by means of electrodes lowered into the well when the latter is filled with a fluid, such as drilling mud for example.

The theoretical considerations underlying these methods are well known to those skilled in the art and will not be given here. It may be stated, however, that the resistance of the earth to a current of electricity flowing through it from an electrode depends in large measure upon the specific resistivity of that portion of the ground in the immediate vicinity of the electrode. Since oil or gas sands have a relatively high specific resistivity and water-bearing sands a relatively low specific resistivity a log can be made of these and other formations at various depths by passing suitable electrode equipment down a well and measuring the specific resistivities at various levels.

The principal utility of the records obtained by these known methods lies in the correlation of the records from a number of wells in a given vicinity so as to yield information as to the subsurface geologic structure in that vicinity. These records are usually difficult to correlate because the electrical variations obtained due to discontinuities in the formations traversed are generally quite gradual and of rather small amplitude and thus fail to provide a well-marked indication of the depths at which these discontinuities exist.

It is an object of my invention to provide a simple method and apparatus for obtaining a log of the location of discontinuities between strata traversed by a well having different electrical impedance characteristics. Another object is to provide an improved method and apparatus for electrically logging wells which gives a clear record of the location and extent of the various formations encountered therein. Further objects and advantages of my invention will be apparent from the following detailed description thereof read in conjunction with the drawing, in which.

In one of its broadest aspects my invention comprises passing electrical currents between each of two vertically spaced electrodes within a well and at least one point in electrical contact with the earth and distant from the electrodes, and measuring a function of the relative magnitude of these electrical currents. Since the resistance of the ground to a current of electricity flowing through it from an electrode depends largely upon the specific impedance in the immediate vicinity thereof, the value of the current flow through each of the electrodes in the well is a measure of the specific impedance of the stratum adjacent each of them, and relative magnitude of these currents is indicative of the relative magnitude of the specific impedances of the strata adjacent each electrode. Obviously the greatest variations in relative magnitude of the currents are obtained when the electrodes are on opposite sides of a discontinuity between dissimilar formations so that such discontinuities are much more clearly marked than when specific impedances themselves are measured.

Figure 1:
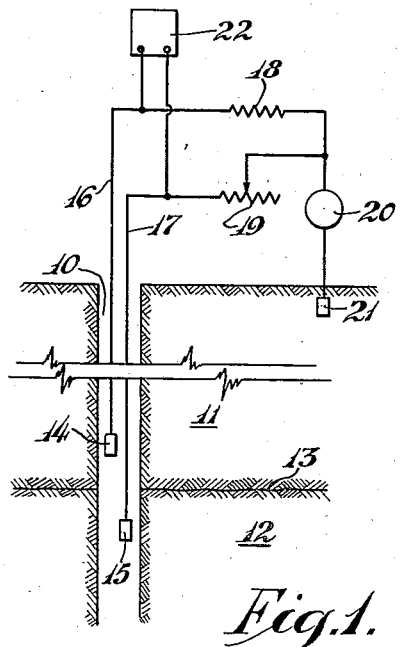
Figure 1 shows a schematic view of one form of apparatus embodying my invention.

My method can best be understood by referring to Figure 1 in which an uncased well 10 penetrates formations 11 and 12 having different electrical characteristics and an interface 13 between them. The logging apparatus includes an array of two vertically spaced electrodes 14 and 15 communicating by means of conductors 16 and 17 and through resistances 18 and 19, respectively, with one terminal of a source of electromotive force 20. The other terminal of source of electromotive force 20 is connected to a third electrode 21 which is located in electrical contact with the earth at a distance from electrodes 14 and 15, preferably at the surface of the earth and spaced from the top of well 10 a distance at least ten times that between the electrodes within the well. If desired, separate sources of electromotive force and grounded electrodes can be used for each circuit but this arrangement has no advantages over that illustrated. The source of electromotive force 20 can be of any suitable type to supply either direct, commutated direct or alternating current. For instance either a battery or a direct current generator can be used as a source of direct current and an alternating current generator to be used to produce alternating current. For most purposes alternating current is preferred in order to avoid polarization at the electrodes and frequencies ranging from about 20 to about 100,000 cycles per second are suitable. Electrodes 14, 15, and 21 can be metal, but if direct current is used for the energizing source, porous pot non-polarizing type electrodes are better. Preferably resistance 19 is adjustable and can be calibrated for purposes which will be described below.

From the above it will be seen that electrical currents can be made to flow between electrodes 14 and 15, respectively, and electrode 21. In order to obtain measurements of the relative magnitude of the currents flowing through electrodes 14 and 15, an instrument 22 is connected across conductors 16 and 17. Instrument 22 can be of either the indicating or the recording type and can be in the nature of a galvanometer or a voltmeter. In either case conventional instruments are suitable. Those used should be capable of measuring and indicating both positive and negative values. Conductors 16 and 17 are preferably included in the usual manner in the cable which is used to raise and lower the electrodes 14 and 15. The actual apparatus necessary to accomplish this raising and lowering is well-known in the art and is therefore not shown nor described in detail in the drawing. The spacing between electrodes 14 and 15 can be, for example, from about 1 foot to about 20 feet or more, depending upon the degree of detail desired in the logging operation.

In logging a well according to my invention, electrodes 14 and 15 having a fixed distance between them are lowered into the well while electrical currents are passed between electrodes 14 and 15 and electrode 21. In one method of operation resistance 19 is adjusted until it is equal in value to resistance 18 and the potential difference between conductors 16 and 17 is measured by means of instrument 22 and recorded either automatically or by an observer for various levels of the electrodes. Obviously the deflections of instrument 22 will be indicative of the differences between the currents flowing in the circuits including electrodes 14 and 15, since the potential drops across resistances 18 and 19 will depend solely upon the values of those currents. These differences in turn depend upon the variations in the specific impedances of the formations adjacent electrodes 14 and 15 for various positions thereof. Ordinarily electrodes 14 and 15 are continuously lowered and a continuous record made but satisfactory results can be obtained by lowering them a short distance, taking a reading and repeating these operations. It is apparent that the same results can be obtained by raising the electrodes and runs can be made in both directions in order to check results. When instrument 22 is a galvanometer or voltmeter a very small amount of current flows between conductors 16 and 17 through instrument 22 and the amount of this current flow is a measure of the relative magnitude of the currents flowing between electrodes 14 and 15 respectively and electrode 21.

In another method of operation adjustable resistance 19 can be manipulated so as to keep instrument 22 at its zero position for various locations of electrodes 14 and 15 within the well. If resistance 19 is provided with suitable indicia a log can be obtained from the various adjustments thereof which will be similar to that obtained by an observer according to the method previously set forth.

Figure 2:
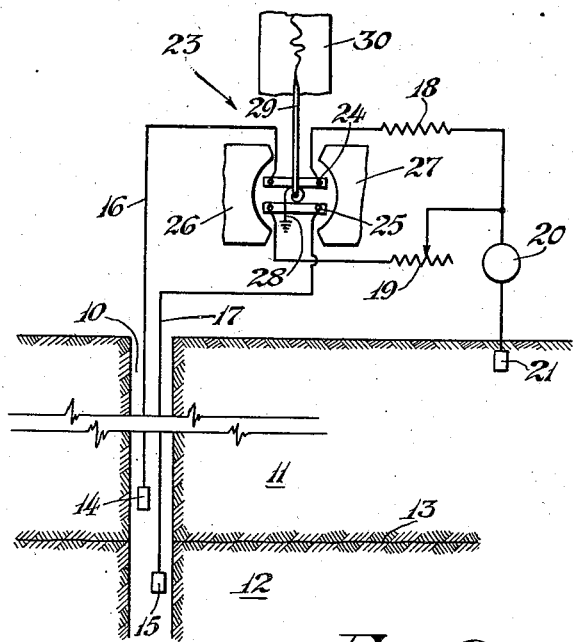
Figure 2 shows a schematic view of a modified apparatus according to my invention utilizing a differential meter type of recorder.

The modification shown in Figure 2 differs from the apparatus of Figure 1 in that a differential type meter 23 is employed instead of instrument 22, the corresponding parts however being given the same identifying symbols. Differential meter 23 has two coils 24 and 25 aligned with each other and arranged to rotate together between magnetic pole pieces 26 and 27. Spring 28 is provided to oppose the rotation of coils 26 and 27 in both directions. Meter 23 is preferably provided with recording means and these are shown as pen arm 29 and recording medium 30 which generally will be moved in the conventional manner at a rate proportional to that at which the level of electrodes 14 and 15 in the well is changed. As shown coil 24 is connected between conductor 16 and resistance 18 and coil 25 is connected between conductor 17 and resistance 19 but in such a way that the electrical currents passing through them tend to deflect the instrument in opposite directions. The position attained by coils 24 and 25 against the action of spring 28 is a known function of the resultant or difference between the magnetic fields set up by each of these currents and consequently is a function of the difference between the specific impedances of the formations adjacent electrodes 14 and 15. As the electrodes in the well are raised or lowered arm 29 changes position as this difference changes, thus giving a log on recording medium 30. Resistances 18 and 19 can usually be eliminated, although they may be used.

Figure 3:
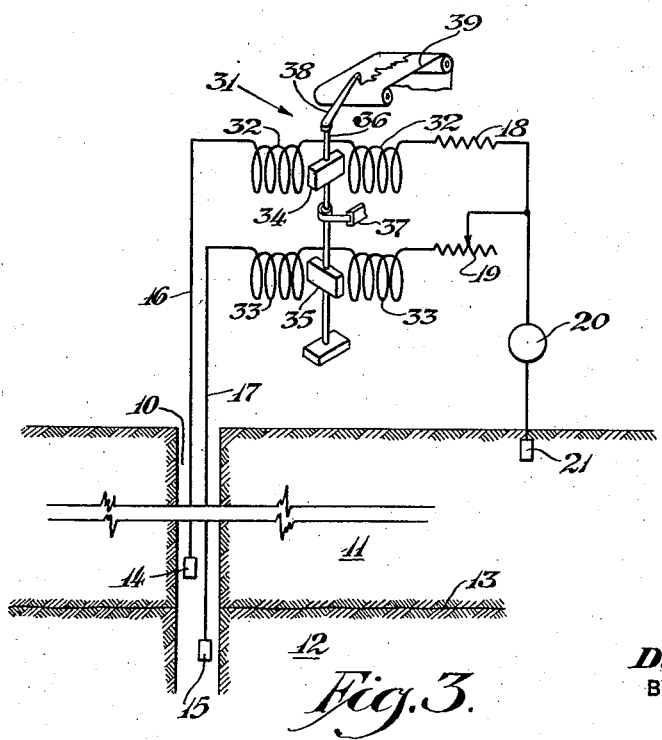
Figure 3 is similar to Figure 2 but illustrates the use of a ratio type recorder.

In Figure 3 I have shown another type of measuring and recording apparatus in which the function recorded is the ratio of the currents flowing through electrodes 14 and 15. Meter 31 is illustrated as one type of ratio meter, a double iron vane ratio meter which produces deflections indicative of the ratio between the absolute values of the current passed through its coils and is therefore especially suitable for use when source of electromotive force 20 is of the alternating current type. As shown coil 32, which is split into two portions, is connected between conductor 16 and resistance 18 while coil 33 similarly split is connected between conductor 17 and resistance 19. As in the arrangement of Figure 2, resistances 18 and 19 can normally be eliminated. Iron vanes 34 and 35 are attached to shaft 36 of the recording unit at a fixed angle with respect to each other, and when no current is passed through coils 32 and 33 vanes 34 and 35 are held at substantially equal and opposite angles with respect to the axes of coils 32 and 33 respectively by means of hair spring 37. As soon as current flows in either coil there is a tendency for the vanes to rotate and line up their long axes in the direction of the magnetic field set up by the respective coils and the tendency of shaft 36 to rotate due to the torque impressed upon it by vane 34 is opposed by the corresponding torque due to vane 35. The equilibrium position reached at any moment is a function of the ratio of the currents passing through coils 14 and 15 and therefore is a measure of the relative magnitude of the specific impedances of the ground in the vicinity of these electrodes. As in Figure 2 rotation of shaft 36 pen arm 38 to produce a continuous record on recording strip 39. Other types of ratio meter can be successfully used.

From the above description it will be seen that I have provided an improved method and apparatus for electrically locating the discontinuities in the walls of an uncased well in producing clearer and easily producible correlated records thereof. Although I have described my invention in connection with certain specific embodiments thereof I do not desire to be limited thereto but only by the following claims in which I have defined my invention.

I claim:

1. The method of logging subsurface strata traversed by a well which comprises simultaneously passing an electrical current between each of two vertically spaced points within said well and at least one point in contact with the earth distant from said spaced points, and measuring a function of the relative magnitude of said electrical currents.

2. The method of logging subsurface strata traversed by a well which comprises simultaneously passing an electrical current between each of two vertically spaced points within said well and at least one point in contact with the earth distant from said spaced points, measuring a function of the relative magnitude of said electrical currents, and repeating these steps at different levels in said well, whereby a log indicative of the electrical discontinuities in the formations penetrated by said well is obtained.

3. The method of logging subsurface strata traversed by a well which comprises continuously changing the level of a pair of vertically spaced electrodes in said well, passing an electrical current between each of said electrodes and a distant grounded electrode, producing electrical effects responsive to a function of the relative magnitude of said electrical currents and recording said electrical effects.

4. The method of claim 3 wherein said electrical currents are of the direct current type.

5. The method of claim 3 wherein said electrical currents are of the alternating current type.

6. The method of logging subsurface strata traversed by a well which comprises continuously changing the level of a pair of vertically spaced electrodes in said well, passing an electrical current between each of said electrodes and a distant grounded electrode, and producing and recording electrical effects responsive to the difference between said electrical currents.

7. The method of logging subsurface strata traversed by a well which comprises continuously changing the level of a pair of vertically spaced electrodes in said well, passing an electrical current between each of said electrodes and a distant grounded electrode, and producing and recording electrical effects responsive to the ratio of said electrical currents.

8. The apparatus for logging subsurface strata traversed by a well which comprises means for simultaneously passing an electrical current through the earth between each of two vertically spaced points within said well and at least one point distant from said spaced points, and means for measuring a function of the relative magnitude of said electrical currents.

9. The apparatus for logging subsurface strata traversed by a well which comprises means for simultaneously passing an electrical current through the earth between each of two vertically spaced points within said well and at least one point distant from said spaced points, means for producing electrical effects responsive to a function of the relative magnitude of said electrical currents and means for recording said electrical effects.

10. The apparatus for logging subsurface strata traversed by a well which comprises a pair of vertically spaced electrodes, means for changing the level of said pair of electrodes in said well, a grounded electrode distant from said pair of electrodes, means for passing an electrical current through the earth between each of said pair of electrodes and said distant electrode, means for producing electrical effects responsive to the relative magnitude of said electrical currents, and means for recording said electrical effects.

11. The apparatus for logging subsurface strata traversed by a well which comprises a pair of vertically spaced electrodes adapted to be lowered into said well, a grounded electrode distanct from said pair of electrodes, means for passing an electrical current through the earth between each of said pair of electrodes and said distant electrode, and means for measuring and recording the difference between said electrical currents.

12. The apparatus for logging subsurface strata traversed by a well which comprises a pair of vertically spaced electrodes adapted to be lowered into said well, a grounded electrode distant from said pair of electrodes, means for passing an electrical current through the earth between each of said pair of electrodes and said distant electrode, and means for measuring and recording the ratio of said electrical currents.

13. The apparatus for logging subsurface strata traversed by a well which comprises a pair of vertically spaced electrodes adapted to be lowered into said well, a grounded electrode distant from said pair of electrodes, a source of electromotive force, means for passing an electrical current from said source of electromotive force through the earth between each of said pair of electrodes and said distant electrode, and means for measuring and recording a function of the relative magnitude of said electrical currents.

14. The apparatus of claim 13 wherein said source of electromotive force is of the alternating current type, and said measuring and recording means includes an iron vane type ratio meter.

DANIEL SILVERMAN.